Patented Feb. 18, 1941

2,232,406

UNITED STATES PATENT OFFICE 2,232,406

PROCESS AND PREPARATION FOR THE MANUFACTURE OF AZO DYESTUFFS

Albert Schmelzer, Cologne-Mulheim, Germany, assignor to General Aniline & Film Corporation, a corporation of Delaware No Drawing. Application October 17, 1939, Serial No. 299,810. In Germany October 26, 1938

9 Claims. (Cl. 8—45)

The present invention relates to a process and preparations for the manufacture of azo dyestuffs on the fiber.

In my copending application Ser. No. 242,575, filed November 26, 1938, I have described and claimed a process and preparations for the manufacture of azo dyestuffs. In that process azo dyestuffs are prepared from coupling components and such diazoamino compounds as contain water-solubilizing groups in the radical attached to the amino-nitrogen and can be split off into the diazo compound and the amine by reduction in the alkalinity of the preparation, in the presence of volatile oxygen-containing watersoluble organic bases; by simply applying heat in the presence of moisture the diazo amino compound is decomposed with the formation of the corresponding diazo compound and coupling of the diazo compound with the coupling component takes place.

It has now been found that also in the known process and preparations used for the manufacture of azo dyestuffs in which the diazo compounds are employed in the form of alkali metal antidiazotates commonly named nitrosamines, the bases used until now, namely fixed alkalies, such as caustic soda lye, can wholly or partially be replaced with the same advantage by oxygen-containing organic bases which are sufficiently volatile with steam to warrant development of the dyestuff within the usual steaming period of about 3 to 5 minutes. If in the mixtures of coupling components and aromatic nitrosamines, used for the preparation of the azo dyestuffs, the fixed alkalis are wholly or partially replaced by volatile oxygen-containing organic bases, the after treatment with an acid or the hanging in the air, which operations had been necessary until now for the production of the dyestuffs after the steaming, is no longer required, since the dyestuff is already formed by expelling the volatile oxygen-containing organic bases by means of steam.

Like in the mentioned copending application the oxygen-containing organic bases must exhibit watersolubility besides volatility with steam. Suitable bases of this kind are e. g.

Monoethylaminoethanol
Diethylaminoethanol
N-propylaminoethanol
Dimethylaminoethanol
Dimethylaminobutanone
Diethylaminoethanol-methylether
N-hydroxyethylpyrolidine In preparations serving for the manufacture of dyestuffs in which the fixed alkalies are only partially replaced by volatile oxygen-containing organic bases, the permissible quantity of the fixed alkalies still present depends upon the components used. This quantity of fixed alkalies may vary within wide limits; it may be higher than is calculated for the formation of the naphtholate.

The coupling components suitable for the new process are the same as hitherto employed in the process of preparing azo dyestuffs on the fiber from nitrosamines serving to provide the diazo compounds in the process; such coupling components are e. g. the arylamides of β-hydroxynaphthoic acid or of o-hydroxycarboxylic acids of higher ring systems, or acylacetic acid arylamides, or keto-methylene compounds capable of coupling, these components being known as ice-color coupling components.

The process itself is also carried out in the usual manner by applying to fibers to be dyed mixtures containing nitrosamines, coupling components, volatile oxygen-containing organic bases, or volatile, oxygen-containing organic bases and fixed alkalies, and the usual additions and steaming the fiber thus printed or impregnated, using neutral steam, without, however, after treating with an acid or hanging for some time as hitherto necessary.

In comparison with the known process in which coupling components, aromatic nitrosamines and fixed alkalies are used the new process yields prints of a better penetration and of fuller, more vivid and clearer shades.

The following examples illustrate the invention without being restricted thereto:

Example 1

Bleached cotton fabric is printed with the following printing paste:

| | Grams |
|---|---|
| Rapid Fast Yellow G (Schultz, Farbstofftabellen, 7.Auflage, No. 49) | 40 |
| Caustic soda lye 38° Bé | 10 |
| Turkey red oil | 20 |
| Diethylethanolamine | 80 |
| Water | 350 |
| Neutral starch-tragacanth thickener | 500 | steamed for 5 minutes in the Mather-Platt, rinsed hot and soaped at the boil. A full greenish-yellow is obtained.

Example 2

A crepe fabric of viscose artificial silk is printed in the manner described in Example 1 with a paste which contains in 1 kg. printing paste 21 grams of 1-acetoacetylamino-2.5-dimethoxy-4-chlorobenzene, an equivalent amount of the potassium anti-diazotate of 1-amino-2-methyl-4-chlorobenzene, 3.5 grams of potassium hydroxide, 20 grams of Turkey red oil and 120 grams of diethylethanolamine, and developed by steaming. A clear greenish-yellow is obtained.

Example 3

A mixed fabric of mercerized cotton and viscose artificial silk is printed in the usual manner with a printing paste of the following composition:

| | Grams |
|---|---|
| Bis - 4.4'-acetoacetylamino-3.3'-dimethyl-diphenyl | 20 |
| 44.6% potassium diazotate of 1-amino-2-methoxy - 5 - chlorobenzene | 18.4 |
| Diethylethanolamine | 100 |
| Turkey red oil | 20 |
| Water | 341.6 |
| Neutral starch tragacanth thickener | 500 |

After steaming, rinsing and soaping a vivid yellow print is obtained.

Example 4

A printing paste corresponding to that of Example 1 which contains per kg. 21 grams of 1-(2'.3'-hydroxynapthoylamino) - 2 - methylbenzene, an equivalent amount of the sodium anti-diazotate of 1-amino-3-chlorobenzene, 4 grams of sodium hydroxide, 20 grams of Turkey red oil and 120 grams of diethylethanolamine, is printed on mercerized cotton fabric and after drying steamed for 4 minutes in the Mather-Platt. A full orange is obtained.

When using Rapid Fast Orange RG (Schultz Farbstofftabellen 7.Auflage No. 52) and printing with the same quantity of diethylethanolamine a beautiful yellowish-orange is obtained.

Example 5

A fabric which consists in the warp of mercerized cotton and in the woof of viscose artificial silk, is printed with a printing paste containing per kg. 21 grams of 1-(2'.3'-hydroxynaphthoylamino)-2-ethoxybenzene, the equivalent amount of the potassium anti-diazotate of 1-amino-2-methyl-5-chlorobenzene, 4.2 grams of sodium hydroxide, 20 grams of Turkey red oil and 120 grams of diethylethanol-amine. The printed fabric is dried, steamed for 5 minutes in the Mather-Platt, rinsed in the heat and soaped. A vivid scarlet is obtained.

Example 6

When using instead of the printing paste of Example 5 a printing paste which contains 1-(2'.3'-hydroxynaphthoylamino)- 4 -methoxy-2-methylbenzene and the nitrosamine from 1-amino-2-methyl-4-chlorobenzene, and proceeding in the same manner a beautiful bluish-red print is obtained.

Example 7

A crepe fabric of viscose artificial silk is printed with a paste containing per kg. 21 grams of 1-(2'.3'-hydroxynapthoylamino)-2-methoxy-benzene, an equivalent quantity of the anti-diazotate from 1-amino-2-methoxy-5-chlorobenzene, 15 grams of caustc soda lye 38° Bé., 20 grams of Turkey red oil and 80 grams of diethylethanol-amine. After drying the printed fabric is steamed for 5 minutes in the Mather-Platt, rinsed in the heat and soaped at the boil. A full bluish-red is obtained.

Example 8

When using 1-(2'.3'-hydroxynaphthoylamino)-3-nitrobenzene instead of the arylide of Example 7 and proceeding otherwise in the same manner a wine-red is obtained.

Example 9

A fabric consisting of pure staple fiber is printed with a paste containing per kg. 21 grams of 1-(2'.3'-hydroxynaphthoylamino)-2 - methylbenzene, the equivalent amount of the nitrosamine sodium salt of 1-amino-5-trifluoromethyl-2-ethylsulfonylbenzene, 2 grams of sodium hydroxide and 120 grams of diethylethanol-amine. After drying the printed fabric is steamed for 5 minutes in the Mather-Platt, rinsed in the heat and soaped at the boil. A vivid golden-orange is obtained.

Example 10

When using instead of the arylide and nitrosamine of Example 9 1-(2'.3'-hydroxynaphthoyl-amino)-2.5-dimethoxybenzene and the nitrosamine sodium salt of 1-amino-2.5-dichlorobenzene and proceeding otherwise in the same manner a vivid red-brown is obtained.

Example 11

A bleached cotton fabric is printed with a paste containing per kg. 21 grams of 1-(3'-hydroxydiphenylene oxide-2'- carboylamino) - 2.5 - dimethoxybenzene an equivalent quantity of the sodium antidiazotate from 1-amino-2-methoxy-5-chlorobenzene, 2 grams of sodium hydroxide, 20 grams of Turkey red oil and 120 grams of diethylethanolamine. The dried print is steamed for 5 minutes in the Mather-Platt. A full black-brown is obtained.

When using instead of the arylide mentioned above 1-(2'-hydroxycarbazole - 3' - carboylamino)-4-chlorobenzene and instead of the mentioned anti-diazotate the anti-diazotate from 1-amino-3-chlorobenzene an olive-brown is obtained.

Example 12

A bleached cotton fabric is printed with the following printing paste:

| | Grams |
|---|---|
| Rapid Fast Blue B (Schultz Farbstofftabellen 7. Auflg. No. 490) | 50 |
| Caustic soda lye 38° Bé | 10 |
| Turkey red oil | 20 |
| Dimethylethanol-amine | 80 |
| Water | 340 |
| Starch tragacanth thickener | 500 |

After drying the printed fabric is steamed for 3 minutes in the Mather-Platt, rinsed in the heat and soaped at the boil. A navy-blue print is obtained.

Example 13

A bleached cotton fabric is printed with the following printing paste:

| | Grams |
|---|---|
| Rapid Fast Blue B (Schultz Farbstofftabellen 7. Auflg. No. 490) | 50 |
| Turkey red oil | 20 |
| N-oxethylpyrrolidine | 120 |
| Water | 310 |
| Starch tragacanth thickener | 500 |

After drying the print is steamed for 3 minutes in the Mather-Platt, rinsed in the heat and soaped at the boil. A navy-blue print is obtained.

Example 14

Bleached cotton piece goods are printed with a paste of the following composition:

| | Grams |
|---|---|
| 1-benzoacetylamino-4-benzoylamino-2.5 - dimethoxy-benzene | 20 |
| 44.6% potassium anti-diazotate from 1-amino-2-methoxy-5-chlorobenzene | 17 |
| Diethylethanol-amine | 100 |
| Anhydrous sodium carbonate | 10 |
| Turkey red oil | 20 |
| Water | 333 |
| Neutral starch tragacanth thickener | 500 |

The goods are dried, steamed for 5 minutes in the Mather-Platt, rinsed and soaped. A vivid full golden-yellow print is obtained.

Example 15

A crepe tissue consisting of viscose artificial silk is printed with a paste containing per kg. 21 grams of 1-(2'.3'-hydroxynaphthoylamino)-2-methoxybenzene, an equivalent quantity of the anti-diazotate from 1-amino-2-methoxy-5-chlorobenzene, 15 grams of caustic soda lye, 38° Bé., 20 grams of Turkey red oil and 80 grams. of N-propylaminoethanol. After drying the print is steamed for 5 minutes in the Mather-Platt, rinsed and soaped. A full bluish-red is obtained.

Example 16

Mouseline-laine is printed with the following printing paste:

| | Grams |
|---|---|
| A mixture of the nitrosamine from 1-amino-2-methyl-4-chlorobenzene with 1-acetoacetylamino-2.5-dimethoxy-4 - chlorobenzene | 60 |
| Diethylaminoethanol | 100 |
| Water | 240 |
| Senegal gum (1:1) | 600 |

The print is steamed for 5 minutes, rinsed and soaped at 60° C. A clear yellow is obtained.

Example 17

A tissue of natural silk is printed with the following printing paste:

| | Grams |
|---|---|
| A mixture of the nitrosamine from 1-amino-2.5 - dichlorobenzene with 1 - (2'.3' - hydroxynaphthoylamino)-2-ethoxybenzene | 80 |
| Diethylaminoethanol | 100 |
| Water | 220 |
| Senegal gum (1:1) | 60 |

The print is steamed for 5 minutes, rinsed and soaped at 60–80° C. An orange is obtained.

Example 18

According to Example 17 a printing paste is prepared containing 80 grams of a mixture of the nitrosamine from 1-amino-2-methyl-5-chlorobenzene with 1 - (2'.3' - hydroxynaphthoylamino)-2-ethoxybenzene. On wool or weighted or unweighted natural silk scarlet prints are obtained.

Example 19

Weighted natural silk is printed with a printing paste prepared according to Example 17 from 80 grams of a mixture of the nitrosamine from 1-amino-2-methyl-5-chlorobenzene with 1-(2'.3'-hydroxynaphthoylamino)-2-methylbenzene. After steaming, rinsing and soaping at 60–80° C. a clear red is obtained.

I claim:

1. In the process of preparing azo dyestuffs on the fiber from coupling components and alkali metal anti-diazotates dissolved in fixed alkalis the improvement which consists in replacing the fixed alkalis substantially by oxygen-containing, water-soluble organic nitrogenous bases volatile with steam and developing the dye-stuffs by simply applying heat and moisture.

2. The process as claimed in claim 1 wherein the development is effected by steaming.

3. The process as claimed in claim 1 wherein as volatile, oxygen-containing, water-soluble organic bases such bases are employed as contain hydroxyalkyl groups.

4. The process as claimed in claim 1 wherein as volatile, oxygen-containing, water-soluble organic bases such bases are employed as contain oxethyl groups.

5. The process as claimed in claim 1 wherein diethylaminoethanol is employed as volatile, oxygen-containing, water-soluble organic base.

6. The dye compositions comprising ice-color coupling components and alkali metal diazotates dissolved to an alkaline reacting solution substantially in oxygen-containing, water soluble organic nitrogenous bases volatile with steam.

7. The preparations as claimed in claim 6 wherein as volatile, oxygen-containing, water-soluble organic bases such bases are employed as contain hydroxyalkyl groups.

8. The preparations as claimed in claim 6 wherein as volatile, oxygen-containing, water-soluble organic bases such bases are employed as contain oxethyl groups.

9. The preparations as claimed in claim 6 wherein diethylaminoethanol is employed as volatile, oxygen-containing, water-soluble organic base.

ALBERT SCHMELZER.